June 22, 1965     G. VARGIU     3,191,065

SAMPLING CIRCUIT

Filed Oct. 3, 1962

INVENTOR
GIACOMO VARGIU
BY *J. I. Chapman*
ATTORNEY

United States Patent Office 3,191,065
Patented June 22, 1965

3,191,065
SAMPLING CIRCUIT
Giacomo Vargiu, Palo Alto, Calif., assignor to Hewlett-Packard Company, Palo Alto, Calif., a corporation of California
Filed Oct. 3, 1962, Ser. No. 228,120
7 Claims. (Cl. 307—88.5)

This invention relates to circuits for sampling signals having a wide range of frequencies.

Sampling circuits are used to reproduce rapidly recurring waveforms as a series of slowly recurring sample pulses having amplitudes which vary with the amplitude of the sampled waveform at successive sample points. These circuits find wide application in sampling oscillography where successively delayed samples are taken of the waveform under examination. Sampling circuits are also used as untuned harmonic phase detectors. In such applications it is desirable to provide a simple and reliable sampling circuit which is capable of producing sample pulses of signals having frequencies of the order of several kilomegacycles.

It is a principal object of the present invention to provide a simple circuit which samples signals having frequencies of the order of several kilomegacycles and which does not require tuning elements.

In accordance with the illustrated embodiment of the present invention a pair of tunnel diodes are connected to receive the waveform under examination and the sampling signal. A pulse is initiated when one of the tunnel diodes is triggered by the sampling signal and is terminated when the other tunnel diode is triggered by the combination of the pulse and the waveform under examination. Pulse width information thus obtained is converted to pulse amplitude information to provide the desired sample information about the waveform under examination.

Other and incidental objects of the present invention will be apparent from a reading of this specification and an inspection of the accompanying drawing in which.

Figure 1:
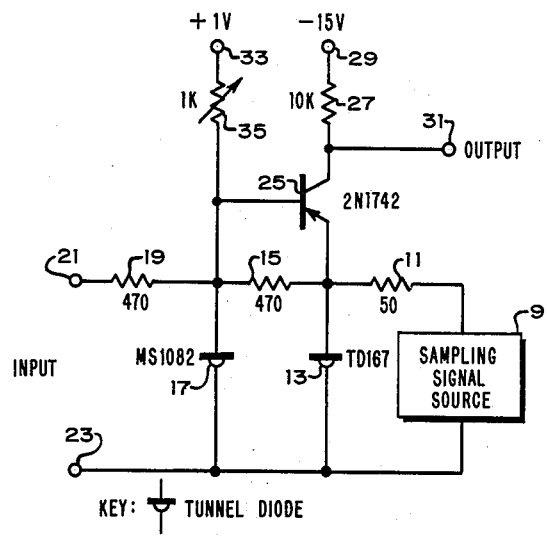
FIGURE 1 is a schematic diagram of the circuit of the present invention.

Referring now to FIGURE 1, there is shown a source of sampling signal 9 connected through resistor 11 to tunnel diode 13. Tunnel diode 17 is connected through resistor 15 to the tunnel diode 13 and is connected through resistor 19 to the input terminals 21 and 23. The emitter electrode of transistor 25 is connected to tunnel diode 13 and the base electrode is connected to tunnel diode 17. The collector electrode of transistor 25 is connected to output terminal 31 and is connected through resistor 27 to the negative terminal 29 of a power supply. Bias current for tunnel diode 17 flows from the positive terminal 33 of a voltage source and through resistor 35.

Figure 2:
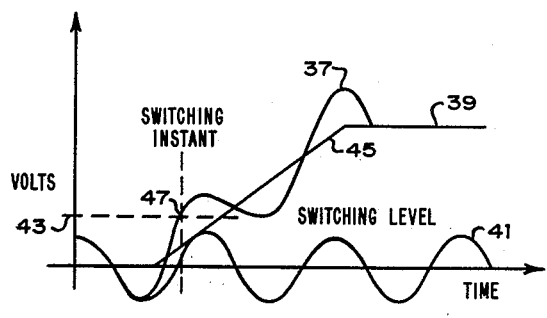
FIGURE 2 is a graph showing the combination of signals applied to the input tunnel diode of the circuit of FIGURE 1.

Tunnel diode 13 is triggered from one operating state to the other operating state by the signal applied thereto from the sampling signal source 9. A signal having a sharp leading edge is thus produced across the tunnel diode 13. The combination of this signal and the signal to be sampled which appears at input terminals 21 and 23 is applied to the input tunnel diode 17. FIGURE 2 shows the signal 39 from tunnel diode 13 and the signal 41 appearing at input terminals 21 and 23 and the combination of these signals 37. The tunnel diode 17 is biased to operate on a load line near the current peak of its current-voltage characteritsic curve. A small additional signal applied to the tunnel diode causes the operating point to shift from a point on the curve in the low voltage operating region to a point on the curve in the high voltage operating region. Thus, the instant 47 at which the tunnel diode 17 changes operating states is determined by the instantaneous value of the combination of the signal appearing across tunnel diode 13 and the signal appearing across input terminals 21 and 23. The switching level 43 is determined by the difference between the current peak of tunnel diode 17 and the bias current therefor provided by voltage supply 33 and resistor 35. If the signal from tunnel diode 13 has constant amplitude and is free from frequency modulation, the time after the change in the operating state of tunnel diode 13 at which tunnel diode 17 changes operating state is determined by the instantaneous amplitude of the signal appearing at input terminals 21 and 23 during the rising portion 45 of the signal from tunnel diode 13. Tunnel diode 17 remains in the high voltage operating state since the signal 41 appearing at input terminals 21 and 23 is not of sufficient amplitude to reduce the conduction current of tunnel diode 17 below the current valley on its characteristic curve.

At the same time, transistor 25 which is normally nonconductive is rendered conductive each time the tunnel diode 13 is triggered to the high voltage operating state and is again rendered nonconductive a small interval later when the tunnel diode 17 is triggered to the high voltage operating state. This is because the difference of voltages across each of the tunnnel diodes is insufficient to forward bias the transistor 25. The momentary conduction period of the transistor 25 is much shorter than the turn-on time of transistor 25. This causes the collector current through resistor 27 during the momentary conduction period to increase with a time constant which is determined substantially by the input capacitances of the transistor 25. At the instant when tunnel diode 17 is switched to the high voltage operaing state and transitsor 25 is rendered nonconductive, the collector current begins to decay exponentially toward zero. Tunnel diode 13 is restored to the low voltage operating state by the signal from sampling signal source 9. This causes the tunnel diode 17 to return to the low voltage operating state. The transitions from the high voltage operating states to the low voltage operating states, first by tunnel diode 13, then by tunnel diode 17, do not affect the signal at output terminal 31 because transistor 25 is in the nonconductive state.

It can be seen that the level to which the collector current in transistor 25 increases is determined by the delay between the switching times of tunnel diode 13 and tunnel diode 17. This has the effect of converting pulse-width information, derived either from the current through resistor 15 or from the difference of voltages appearing across the tunnel diode, into pulse-amplitude information which may then be fed into a stretcher or other suitable means for reproducing the applied signal.

The sampling circuit of the present invention thus provides a simple and reliable scheme for deriving high level sample pulses from an extremely high frequency signal using only a small unmber of circuit components.

I claim:
1. An input signal sampling circuit comprising first and second tunnel diodes, a bias supply connected to said tunnel diodes for biasing the same to operate in two states, a source of signal, means including said source and the first tunnel diode to produce a sampling signal, means connected to the second tunnel diode for applying said sampling signal thereto to change the operating state thereof, means connected to the second tunnel diode for applying an input signal to be sampled to the second tunnel diode, a transistor having electrodes forming an input circuit and an output circuit, means connecting the elec- trodes forming the input circuit of said transistor to said tunnel diodes, and means including the output circuit of said transistor for producing an output related to the difference in the times of operation of said tunnel diodes in corresponding operating states.

2. An input signal sampling circuit comprising first and second tunnel diodes each biased to operate in two states and each being stable in at least one of said operating states, a source of signal, means including said source and the first tunnel diode to produce a sampling signal, means to apply said sampling signal to the second tunnel diode with sufficient amplitude to change the operating state thereof, means connected to the second tunnel diode for applying an input signal to be sampled to the second tunnel diode, a transistor having emitter and collector electrodes forming an output circuit and having base and emitter electrodes forming an input circuit, the base electrode of said transistor being connected to one of said tunnel diodes, the emitter electrode of said transistor being connected to the other of said tunnel diodes, and means including the output circuit of said transistor for producing an output related to the difference in times of the changes in operating states of the first and second tunnel diodes.

3. An input signal sampling circuit comprising a trigger circuit having two operating states identified by higher and lower level output signals, a source of sampling signal having higher and lower signal levels, means connected to said trigger circuit for applying thereto the combination of the sampling signal and an input signal to be sampled for producing a change in the operating state of said trigger circuit, and means connected to said trigger circuit and to said source for producing an output related to the difference in the time of operation of said trigger circuit in one operating state and the time of operation of said source at one of said higher and lower signal levels.

4. An input signal sampling circuit comprising a pair of trigger circuits, each having two operating states identified by higher and lower level output signals, means including one of said trigger circuits for producing a sampling signal, means connected to the other trigger circuit for applying thereto the combination of an input signal to be sampled and said sampling signal for producing a change in the operating state of said other trigger circuit, and means connected to said trigger circuits for producing an output related to the difference in time of operation of said trigger circuits in selected ones of said operating states.

5. A circuit according to claim 4 wherein said trigger circuits each include a tunnel diode biased for stable operation in at least one of said operating states.

6. A sampling circuit for sampling an input signal, the circuit comprising:
a pair of trigger circuits operable only in either one of two operating states in response to a signal applied thereto attaining a selected value;
a source of sampling signal;
means connected to said trigger circuits for applying to one of said trigger circuits a first combination of the sampling signal and an input signal with sufficient amplitude to change the operating state thereof and for applying to a second one of said trigger circuits a second combination of the sampling signal and an input signal with sufficient amplitude to change the operating state thereof, the ratio of sampling signal amplitude to input signal amplitude in the first combination of said signals being unequal to the ratio of the amplitude of the same signals in the second combination of said signals, whereby each of the trigger circuits changes operating states in response to the amplitude of the respective combination of said signals applied thereto attaining said selected value; and
means connected to said trigger circuits for producing an output related to the difference in time of changes in the operating states of said trigger circuits.

7. A sampling circuit for sampling an input signal, the circuit comprising:
a pair of tunnel diode circuits operable only in either one of two operating states in response to a signal applied thereto attaining a selected value;
a source of sampling signal;
means connected to said tunnel diode circuits for applying to one of said tunnel diode circuits a first combination of the sampling signal and the input signal with sufficient amplitude to change the operating state thereof and for applying to a second one of said tunnel diode circuits a second combination of the sampling signal and the input signal with sufficient amplitude to change the operating state thereof, the ratio of sampling signal amplitude to input signal amplitude in the first combination of said signals being unequal to the ratio of the amplitudes of the same signals in the second combination of said signals, whereby each of the tunnel diode circuits changes operating states in response to the amplitude of the respective combination of said signals applied thereto attaining said selected value; and
integrating means connected to said tunnel diode circuits for producing an output voltage related to the difference in time of changes in the operating states of said tunnel diode circuits.

References Cited by the Examiner

UNITED STATES PATENTS

| | | | |
|---|---|---|---|
| 2,486,390 | 11/49 | Cunningham | 328—150 X |
| 2,556,457 | 6/51 | Watts | 332—14 |
| 2,564,578 | 8/51 | Loughren | 328—151 X |
| 2,617,879 | 11/52 | Sziklai | 328—14 X |
| 2,662,113 | 12/53 | Schouten et al. | 328—14 X |
| 2,883,650 | 4/59 | Brockway | 332—14 X |
| 3,103,600 | 9/63 | Lewin | 307—88.5 |
| 3,115,583 | 12/63 | Hinkein | 307—88.5 |
| 3,122,649 | 2/64 | Roop | 307—88.5 |

JOHN W. HUCKERT, *Primary Examiner.*

ARTHUR GAUSS, *Examiner.*